United States Patent
Azorin

(10) Patent No.: US 6,536,909 B1
(45) Date of Patent: Mar. 25, 2003

(54) DISPLAY BACKLIGHTS

(75) Inventor: Bernard Azorin, Montauban (FR)

(73) Assignee: Editions Publicite Excelsior, Montauban (FR)

( * ) Notice: Subject to any disclaimer, the term of this patent is extended or adjusted under 35 U.S.C. 154(b) by 0 days.

(21) Appl. No.: 09/763,467

(22) PCT Filed: Jul. 21, 1999

(86) PCT No.: PCT/FR99/01786

§ 371 (c)(1),
(2), (4) Date: Feb. 23, 2001

(87) PCT Pub. No.: WO00/12930

PCT Pub. Date: Mar. 9, 2000

(30) Foreign Application Priority Data

Aug. 26, 1998 (FR) .............................. 98 10731

(51) Int. Cl.⁷ .................................. F21V 7/04
(52) U.S. Cl. .................. 362/31; 362/553; 362/556; 362/558; 362/560; 362/26; 385/31
(58) Field of Search ................. 362/553, 556, 362/558, 560, 26, 27, 812, 31, 572, 570; 40/546; 385/31, 146, 901

(56) References Cited

U.S. PATENT DOCUMENTS 3,491,245 A  *  1/1970  Hardesty ............... 250/227.11
5,760,858 A  *  6/1998  Hodson et al. ............... 349/61

FOREIGN PATENT DOCUMENTS

GB         2 168 519         6/1986
WO       WO 97/17689        5/1997

* cited by examiner

Primary Examiner—Stephen Husar
Assistant Examiner—Bertrand Zeade
(74) Attorney, Agent, or Firm—Young & Thompson

(57) ABSTRACT

Display backlights arranged in an environment with an optical index $n_1$ such as air. The display backlight includes a transparent plate with an optical index $n_2$ higher than $n_1$, the plane is delimited by two parallel plane surfaces and by a peripheral edge. The display backlight also includes a light source coupled with the peripheral edge such that the rays emitted by the source penetrate into the plate and are propagated inside the plate between the two surfaces mainly by total internal reflections. The display backlight further includes a layer made of a transparent material arranged in optical contact with a plane of the plate, the material of the plane having an optical index $n_3$ higher than $n_1$.

11 Claims, 4 Drawing Sheets

DISPLAY BACKLIGHTS

BACKGROUND OF THE INVENTION

The present invention relates to display backlights which make it possible to display any message in the visible light range, and more especially, but not exclusively, display backlights for use in advertising or similar.

Numerous realisations of display panels of the illuminated type are known. However, these realisations are not sufficiently simple to permit the manufacture in large quantities of advertising display panels.

The aim of the present invention is also to realise a display backlight, the structure of which overcomes the above-mentioned disadvantages of display backlights of prior art.

SUMMARY OF THE INVENTION

More precisely, the subject matter of the present invention is a display backlight capable of being disposed in an environment having an optical index with a value $n_1$ characterised in that it comprises:

- a plate formed from a first material transparent for at least one light wavelength in the bandwidth of visible light, said first material having an optical index with a value $n_2$ higher than the value $n_1$, said plate being delimited by two substantially parallel plane surfaces having a substantially optical polish and by a peripheral edge,
- a source of visible light,
- means for coupling said source of visible light with the peripheral edge of said plate such that the rays emitted by said source of visible light penetrate into the plate via this peripheral edge and are propagated inside the plate between the two plane surfaces mainly by total reflections, and
- at least one first layer formed from a second material transparent for said wavelength, said first layer being disposed in optical contact with a first of the two plane surfaces of the plate, said second material having an optical index with a value $n_3$ higher than the value $n_1$.

BRIEF DESCRIPTION OF THE DRAWINGS

Other features and advantages of the present invention will appear in the course of the following description given with reference to the annexed drawings by way of non-restrictive illustration, wherein:

Although FIGS. 1 to 6 represent different embodiments of the display backlight according to the invention, the same reference numbers in them designate the same elements whichever figure they appear on and whatever the representation of these elements.

The Applicant is also concerned to make it clear that the figures represent different embodiments of the object according to the invention, but other embodiments may exist which also meet the definition of this invention.

He also makes clear that when, according to the definition of the invention, the object of the invention comprises "at least one" element having a given function, the embodiment described can include several of these elements.

He also makes clear that, if the embodiments of the object according to the invention such as illustrated include a plurality of elements of identical function and if, in the description, it is not specified that the object according to this invention should necessarily include a particular number of these elements, it will be possible to define the object of the invention as including "at least one" of these elements.

DETAILED DESCRIPTION OF THE PREFERRED EMBODIMENTS

Figure 1:
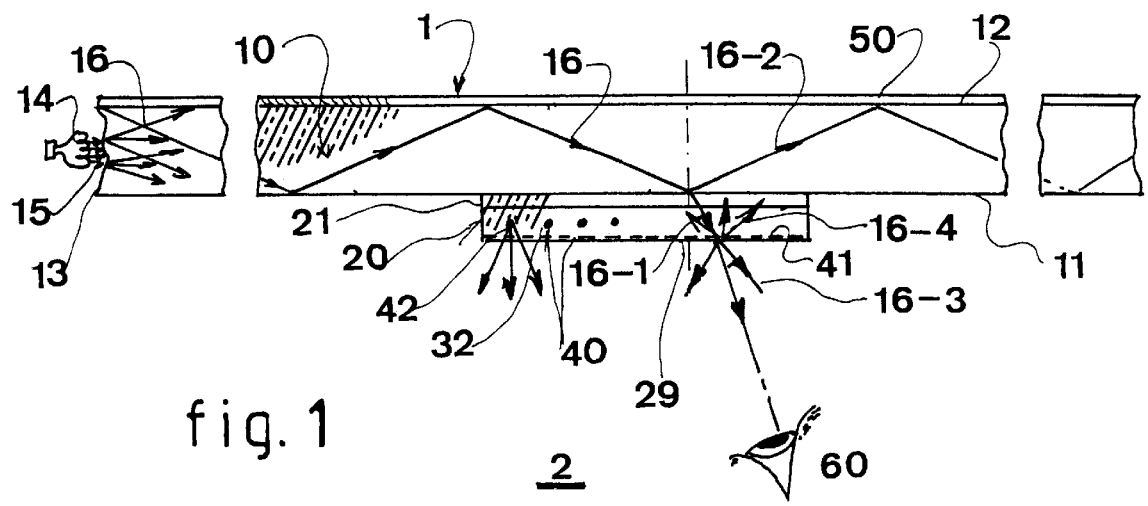
FIGS. 1 and 2 represent an embodiment of the display backlight according to the invention, FIG. 1 representing a sectional view of the display backlight according to FIG. 2, referred to as I—I on this FIG. 2.
Figure 2:
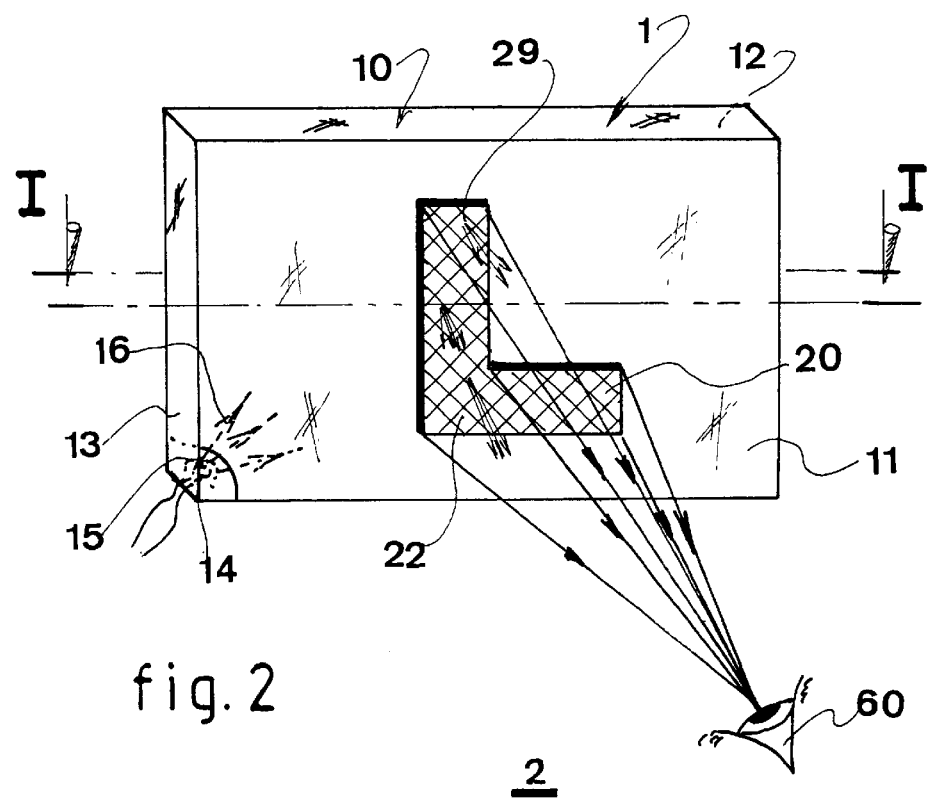

FIGS. 1 and 2 represent a first embodiment of a display backlight 1 capable of being disposed in an environment 2 having an optical index with a value $n_1$, such as air, the value of $n_1$ being in this case equal to 1.

The display backlight 1 comprises a plate 10 formed from a first material which is transparent for at least one light wavelength in the visible bandwidth.

This first material has an optical index with a value $n_2$ higher than the value $n_1$. It is constituted, for example, by organic or mineral glass, PMMA, or by a material known under the trade name "Altuglas" etc.

The plate 10 is delimited by two plane surfaces 11, 12 which are advantageously substantially parallel and have a substantially optical polish, and by a peripheral edge 13.

The display backlight comprises in addition a source of visible light 14, for example a lamp emitting in the visible light range such as a neon lamp or similar.

It also comprises means 15 for coupling the output of the source of visible light 14 with the peripheral edge 13 of the plate 10 such that the light rays 16 emitted by the source of visible light can penetrate into the plate via this peripheral edge and are propagated inside the plate between the two plane surfaces 11, 12 mainly by a succession of total reflections, as happens in optical fibres or similar. These coupling means can be of different types, for example, lenses, focussing devices, light wave guides, etc. They are well known in themselves by people skilled in the art and will not be described more fully here, solely in the desire to simplify the present description.

The display backlight comprises in addition at least one first layer 20 formed from a second material which is transparent for the previously mentioned wavelength and disposed in optical contact with a first 11 of the two plane surfaces 11, 12 of the plate 10.

This second material, for example plastics material such as PVC, polyester etc., has an optical index with a value $n_3$ which is higher at least than the value $n_1$ and even advantageously, if that is possible, higher than the value $n_3$.

In addition, means 40 are provided for diffusing the light capable of being propagated in the first layer 20. These light diffusion means 40 can be constituted for example by a diffusing screen 41 realised on the surface 29 of the first layer 20 which is not in contact with the first surface 11 of the plate 10, this diffusing screen being schematically represented by a broken line, and/or by dots of opaque materials 42 contained in the first layer 20. In the latter case, the dots of white opaque materials 42 are for example made up of a grid, a graded or non-graded screen, or similar, embedded in this first layer.

With the aim of improving its luminosity, the display backlight can comprise, as illustrated on FIGS. 1 and 2, a second layer 50 formed from a material which reflects the wavelength mentioned previously, this second layer 50 being deposited on the second surface 12 of the plate 10.

The display backlight, a first embodiment of which has been described above in respect of FIGS. 1 and 2, functions in the following manner:

First of all it is assumed that the first layer 20 is made up of a single material which has an optical index with a value $n_3$ higher than the value $n_2$, that the optical index $n_1$ is that of air, i.e. equal to 1, and that the index $n_2$ higher than 1 is for example equal to 1.52, that of glass.

This being specified, the lamp 14 is lit so that the light rays 16 which it emits are propagated inside the plate 10 undergoing a succession of total reflections on the two plane surfaces 11, 12, on account of the fact that the latter are relatively well polished and that they form separation dioptres between an incident environment having an optical index $n_3$ higher than the index $n_1$ of the exterior environment constituted by the air.

However, when the light rays 16 arrive at the level of the separation dioptre between the plate 10 and the first layer 20, they undergo partial refraction 16-1 into the layer 20 and partial reflection 16-2 to continue to be propagated in the plate 10.

The creation of refracted rays 16-1 is favoured by an optical index $n_2$ of the first layer 20 higher than the optical index $n_2$ of the plate 10. In the case where $n_3$ is between $n_1$ and $n_2$, the refraction will be less significant but will exist nevertheless.

The refracted rays 16-1 fall then on the diffusing screen of the surface 29 and undergo diffraction by transmission 16-3 and by reflection 16-4. As the rays diffracted by transmission 16-3 divide up in a relatively large solid angle, a number of these rays are necessarily substantially normal to the plane of surface 29 and can emerge from the first layer 20 then be propagated in the air and thus also picked up, for example by the eye 60 of an observer.

In fact, the phenomenon described above takes place over the entire surface 29 of layer 20 and the observer can detect the luminous objet 22 which the first layer 20 forms on plate 10.

By way of example, illustrated on FIG. 2, the first layer 20 presents the shape of an "L" and in this case, the observer will detect this luminous "L" without making out in any noteworthy manner all the rest of the surface 11 of plate 10, especially if this surface has the necessary polish to prevent the beams which are being propagated inside the plate from emerging, even only partially, from this surface 11.

Since it is after all relatively difficult to obtain a perfect optical polish, it is advantageous to cover at least the second surface 12 of plate 10 with the reflective layer 50 mentioned previously, just as, if that is possible, the whole of the edge 13 of the plate and the portion of the surface 11 which is not covered by the first layer 20.

The first layer 20 defined previously has been described as being unitary. However it is very obvious that it can be constituted in different ways, especially like the one which is illustrated on the two FIGS. 1 and 2.

This first layer 20 can indeed be constituted by superposing, the one on the other, at least two first and second sub-layers 21, 32, realised, as regards their respective thickness and the materials constituting them, in such a way that together they are optically equivalent to the first layer 20.

It is important that the first sub-layer 21 be disposed perfectly in optical contact on the first surface 11 of plate 10.

It can thus be constituted by glue making it possible to make the second sub-layer 32 adhere perfectly on the first surface 11 of plate 10.

However, in an advantageous embodiment, the first sub-layer 21 can be made up of a water-based or solvent-based glue. As for the second sub-layer 32, it can be made up of a mixture of a glue, for example the one constituting the first sub-layer 21, with white pigments, for example titanium dioxide, so as to obtain a second sub-layer perfectly self-adhesive on the first sub-layer and thus form, with the two sub-layers together, a white and opaque adhesive glue adhering to the first surface 11 of plate 10.

This assembly constitutes in fact the first layer 20 as defined previously comprising in addition the diffusing screen 41, constituted as mentioned before by a grid, a graded or non-graded screen, or similar. This first layer 20 thus makes it possible to conduct the light like a light wave guide.

This first layer 20, realised in a unitary manner or not as mentioned above, makes it possible to obtain with specific structural realisations different distributions of the light.

In a first embodiment, this first layer 20 with the diffusing screen 41, is presented in the form of bands, for example in line, these bands being realised according to the formats of the panels but always observing a predetermined type of layout.

For example these bands are perpendicular to the axes of the fluorescent light tubes which are disposed parallel to the peripheral edge 13.

Furthermore, these bands can have a cross-section, taken opposite these tubes, of a relatively low value to reach wider cross-sections substantially at the level of the center of the plate or on a central axis of the latter, the space between two bands being determined so as to obtain the desired visual return for a required distribution of the light.

Figure 4:
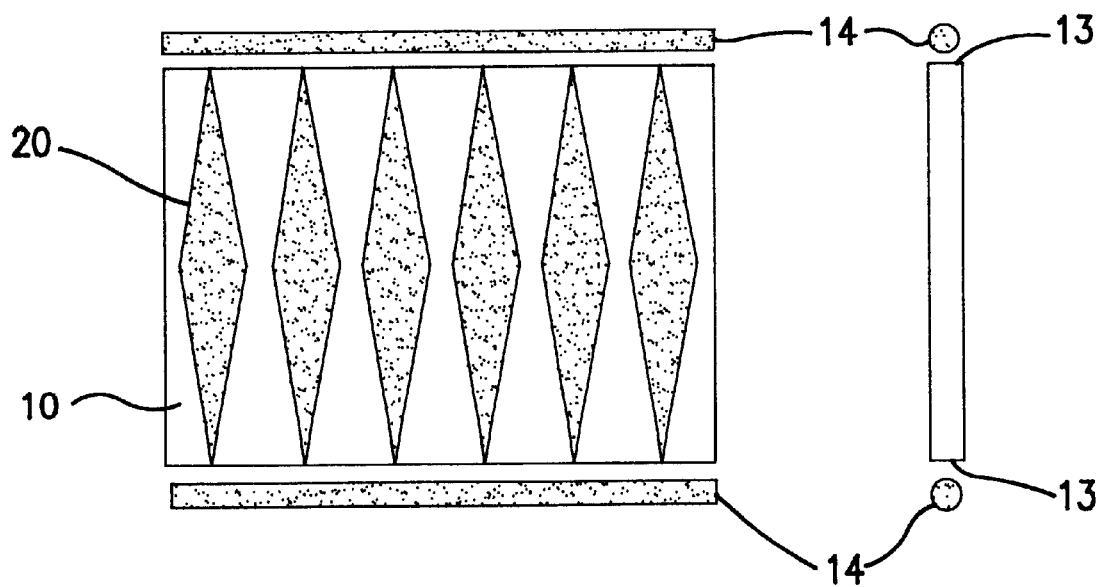
FIGS. 4, 5 and 6 represent schematically other embodiments of the display backlight according to the invention, in front elevation and side view.
Figure 5:
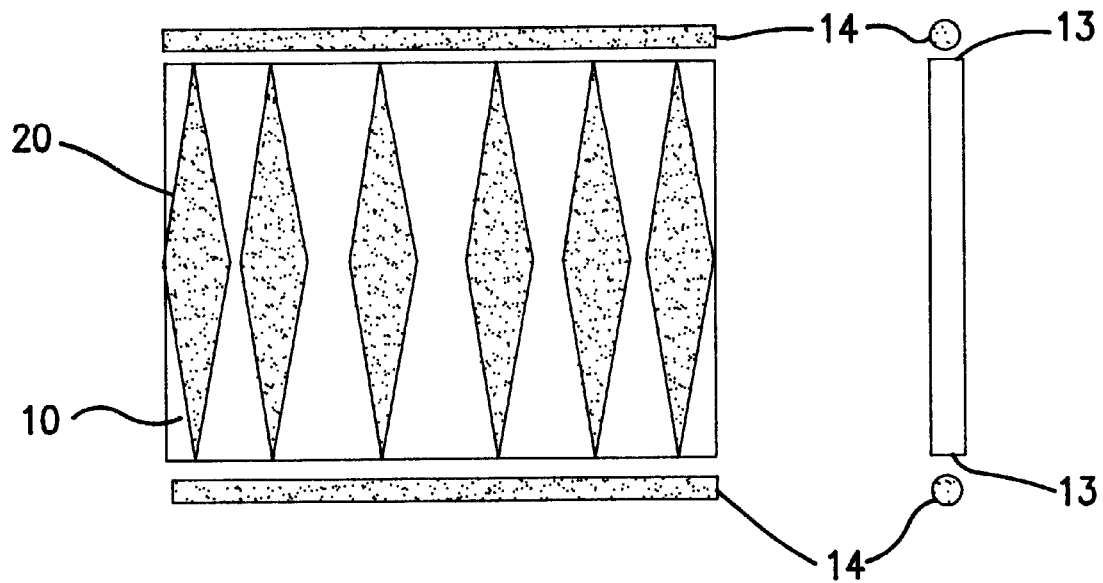
Figure 6:
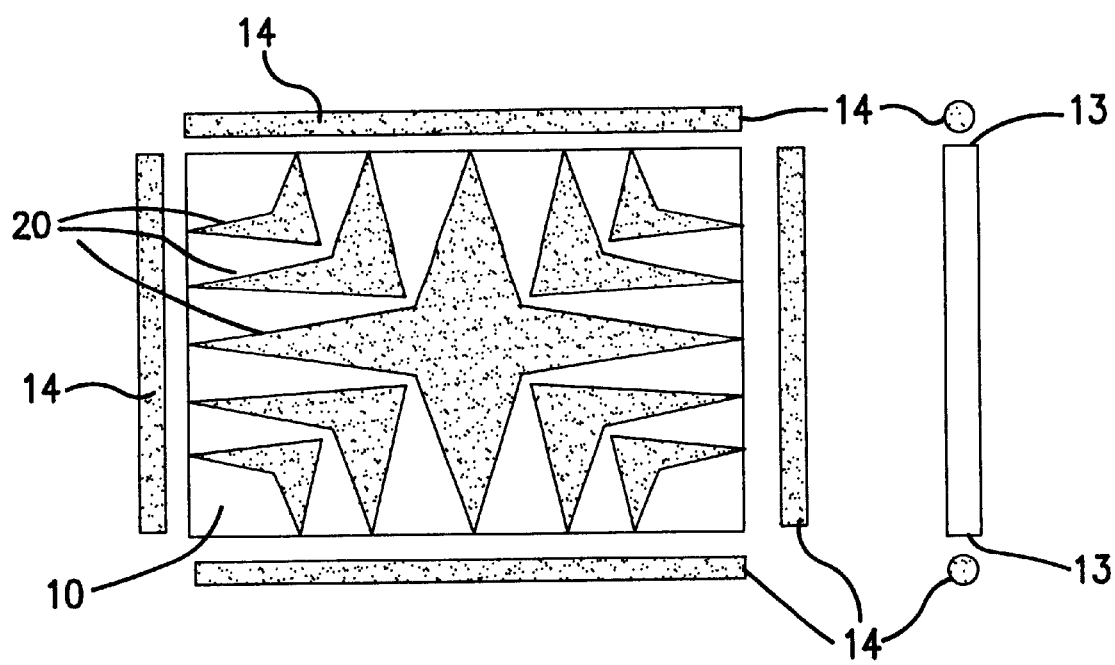

FIGS. 4, 5 and 6 represent possible embodiments of plates 10 with their first layer 20 as defined above.

FIG. 4 shows a display backlight comprising a plate 10, the edges 13 of which are illuminated by two fluorescent light tubes 14 placed on two opposite sides of plate 10, with parallel bands, such as described higher up, regularly spaced.

FIG. 5 shows a display backlight comprising a plate 10, the edges 13 of which are illuminated by two fluorescent light tubes 14 placed on two opposite sides of plate 10, with parallel bands as described higher up, irregularly spaced, the bands closest to the non-illuminated edges of the plate being closer to one another.

FIG. 6 shows a display backlight comprising a plate 10, the edges 13 of which are illuminated by four fluorescent light tubes 14 placed on the four sides of the plate 10, the bands being perpendicular to the axis of the tubes as described higher up, up to the diagonals of plate 10, as represented on FIG. 6.

By way of example, the Applicant has established the mean luminance on a plate of PMMA which is 620 mm by 860 mm and 12 mm thick, according to lighting and bands of the type represented on FIG. 4; the two fluorescent tubes are tubes with a power of 30 watts and a length of 900 mm, and the luminance has been measured on the opposite side of the surface of the plate from the side bearing the bands; the bands have a width of approximately 0.075 mm close to the edges 13 and a width of 1.5 mm on a centre line of the plate at the location where they are the widest, forming a total surface of approximately 0.119 $m^2$ for a plate surface equal to 0.533 m², the regular spacing of the bands is 3.5 mm measured near the edges 13; the measurements of luminance at different points of the plate and at a distance of two meters from the latter, in a direction perpendicular to the surface of the plate, have made it possible to establish a mean luminance of the plate of 405 Cd/m².

Layer 20 can also be constituted by an adhesive layer, on one surface of which is fixed a screen which can be a layer of ink, of paint or of fibres. The integral adhesive and screen can be realised in the form of a sheet which will be fixed by simple pressure on one surface of plate 10, by means of the surface of the adhesive layer opposite the one bearing the screen.

In the case where the display backlight is realised as illustrated on FIGS. 1 and 2, the observer's eye 60 detects the beams 16-3 diffracted by transmission. In this case the observer should be positioned on the side of plate 20 opposite its surface 12 which bears the reflective layer 50.

Figure 3:
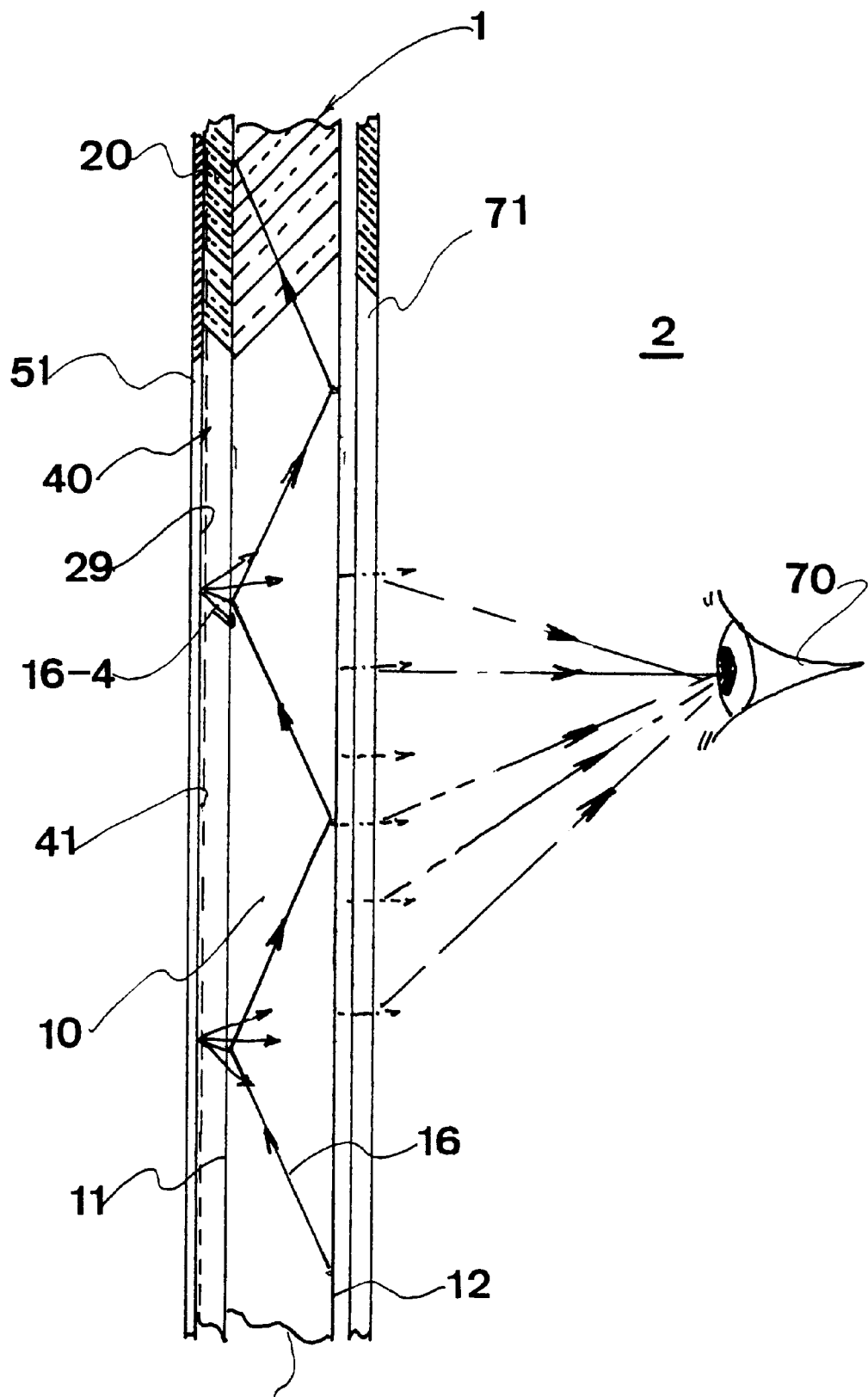
FIG. 3 represents a partial sectional view of a second embodiment of the display backlight according to the invention.

In the embodiment illustrated on FIG. 3, the display backlight does not include a second reflective layer 50 on the second surface 12 of the plate 10. The observer can thus detect the beams 16-4 diffracted by reflection on the surface 29 of the first layer 20. In this case, the eye 70 can be placed on the other side of plate 10 in relation to its position for the embodiment according to FIGS. 1 and 2.

It is even also conceivable, by way of possible application of the display backlight according to the invention, that the first layer 20 covers all the first surface 11 of the plate 10 and thus makes it possible to illuminate, from behind in the manner of a transparency, an image 71 positioned opposite the second surface 12 of the plate.

For the second embodiment described with regard to FIG. 3, in order to increase the quantity of light 16-4 diffracted by reflection, it can be advantageous to cover the surface 29 of the first layer 20 with a third layer 51 formed from a material which is reflective for the same wavelength as that mentioned above.

What is claimed is:

1. Display backlight (1) capable of being arranged in an environment (2) having an optical index with a value n1 comprising:

a plate (10) formed from a first material transparent for at least one light wavelength in the bandwidth of visible light, said first material having an optical index with a value n2 higher than n1, said plate being delimited by two substantially parallel plane surfaces (11, 12) having a substantially optical polish and by a peripheral edge (13), a source of visible light (14), means (15) for coupling said source of visible light (14) with the peripheral edge (13) of said plate (10) such that the rays (16) emitted by said source of visible light penetrate into the plate via this peripheral edge (13) and are propagated inside the plate between the two plane surfaces (11,12) mainly by total reflections, and at least one first layer (20) formed from a second material transparent for said wavelength, said first layer being disposed in optical contact with a first (11) of the two plane surfaces (11,12) of the plate (10), said second material having an optical index with a value n3 higher than the value n1, said first layer (20) being constituted by superposing, the one on the other, at least two first and second sub-layers (21, 32), these two sub-layers being realised, as regards their respective thickness and the materials constituting them, in such a way that together they are equivalent to the first layer, said first sub-layer (21) being disposed in optical contact on the first surface (11) of the plate (10), characterised in that said first sub-layer (21) is constituted by glue making it possible to make the second sub-layer (32) adhere on the first surface (11) of the plate, and in that said second sub-layer (32) is constituted by glue with which pigments are mixed.

2. Display backlight according to claim 1, characterised in that said first sub-layer (21) is made up of water-based or solvent-based glue.

3. Display backlight according to claim 1, characterised in that the value n3 is higher than the value n2.

4. Display backlight according to claim 1, characterised in that said first layer (20) comprises in addition means (40) for diffusing the light capable of being propagated there.

5. Display backlight according to claim 4, characterised in that said means for diffusing the light capable of being propagated in the first layer (20) are constituted by a diffusing screen (41) realised on the surface (29) of this first layer (20) which is not in contact with the first surface (11) of the plate (10).

6. Display backlight according to claim 4, characterised in that said means for diffusing the light capable of being propagated in the first layer (20) are constituted by dots of opaque materials (42) contained in said first layer.

7. Display backlight according to claim 6, characterised in that the dots of opaque materials (42) are constituted by a grid or screen embedded in said first layer (20).

8. Display backlight according to claim 1, characterised in that it comprises a second layer (50) formed from a material which is reflective for said wavelength and deposited on the second surface (12) of the plate (10).

9. Display backlight according to claim 1, characterised in that it comprises a third layer (51) formed from a material which is reflective for said wavelength and deposited on the surface (29) of the first layer (20) which is not in contact with the first surface (11) of the plate (10).

10. Display backlight according to claim 1, characterised in that said first layer (20) comes in the form of bands which have cross-sections adapted to obtain a specific distribution of the transmitted light.

11. A display backlight comprising:

a visible light source;

a transparent plate having first and second planar surfaces and a peripheral edge, said first and second planar surfaces being substantially optically polished to reflect light from said visible light source, said transparent plate having a first optical index;

a coupling device for coupling the visible light source with the peripheral edge; and an optical layer directly contacting only a portion of one of said first and second planar surfaces, said optical layer having a second optical index different from said first optical index, said optical layer comprising a first sub-layer directly contacting said first planar surface and a second sub-layer directly contacting said first sub-layer, said first sub-layer being a transparent glue, said second sub-layer being said transparent glue with opaque optical particles dispersed through said second sub-layer, wherein said plate reflects the light in said portion of said one of said first and second planar surfaces having the optical layer and in portions of the plate where the optical layer is absent and transmits the light only in said portion of said one of said first and second planar surfaces having the optical layer.

* * * * *